US005950431A

United States Patent [19]

Oogushi

[11] Patent Number: 5,950,431

[45] Date of Patent: Sep. 14, 1999

[54] TANDEM PUMP APPARATUS

[75] Inventor: Naoki Oogushi, Kariya, Japan

[73] Assignee: Aisin Seiki Kabushiki Kaisha, Aichi-pref., Japan

[21] Appl. No.: 08/957,183

[22] Filed: Oct. 24, 1997

[30] Foreign Application Priority Data

Oct. 29, 1996 [JP] Japan .................................... 8-286951

[51] Int. Cl.[6] .................................................... F16D 31/02

[52] U.S. Cl. ................................................ 60/468; 60/486

[58] Field of Search .............................. 60/420, 468, 486, 60/494, 422, 428; 91/532

[56] References Cited

U.S. PATENT DOCUMENTS

| | | | |
|---|---|---|---|
| 3,304,709 | 2/1967 | Mercier et al. | 60/422 X |
| 3,587,237 | 6/1971 | Pierrat | 60/468 X |
| 4,223,646 | 9/1980 | Kinder | 60/468 X |
| 4,528,814 | 7/1985 | Stuhr | 60/428 X |
| 4,798,050 | 1/1989 | Nakamura et al. | 60/468 X |
| 4,825,659 | 5/1989 | Huydts | 91/532 X |
| 5,615,553 | 4/1997 | Lourigan | 60/486 X |

FOREIGN PATENT DOCUMENTS

| | | | |
|---|---|---|---|
| 1216124 | 5/1966 | Germany | 60/486 |
| 62-139918 | 6/1987 | Japan . | |
| 8-82287 | 3/1996 | Japan . | |
| 729388 | 5/1980 | Russian Federation | 60/486 |

*Primary Examiner*—John E. Ryznic
*Attorney, Agent, or Firm*—Hazel & Thomas, P.C.

[57] ABSTRACT

A tandem pump apparatus having a first hydraulic pump for supplying operating fluid to a first actuator and a second hydraulic pump for supplying operating fluid to a second actuator in cooperation with each other is disclosed. Each hydraulic pump is provided with a flow rate control valve for refluxing a surplus of flow discharged from the pump to a suction side of the pump through a relief passage. A connecting passage connects the first relief passage downstream from the first flow rate control valve and the second relief passage downstream from the second flow rate control valve. A check valve is provided in the connecting passage for allowing operating fluid to flow from one of the relief passages that has a relatively great reflux flow rate to the other relief passage having a relatively small reflux flow rate, thereby ensuring sufficient supercharge into the two pump to achieve sufficient restraint of cavitation.

5 Claims, 4 Drawing Sheets

TANDEM PUMP APPARATUS

Japanese Patent Application No. Hei 8-286951, filed on Oct. 29, 1996, including the specification, drawings and abstract, is incorporated herein by reference in its entirety.

BACKGROUND OF THE INVENTION

1. Field of the Invention

The present invention relates to a tandem pump apparatus wherein a first hydraulic pump for supplying operating fluid to a first actuator and a second hydraulic pump for supplying operating fluid to a second actuator work in cooperation with each other.

2. Description of the Related Art

A tandem pump apparatus of the aforementioned type is disclosed in, for example, Japanese Patent Laid-Open No. Sho 62-139918, wherein a first hydraulic pump is provided with a first flow rate control valve for refluxing a surplus of the flow discharged from the first hydraulic pump to a suction side of the pump through a first relief passage, and a second hydraulic pump is provided with a second flow rate control valve for refluxing a surplus of the flow discharged from the second hydraulic pump to a suction side of the pump through a second relief passage, so that the supercharging effect by the refluxes will restrain cavitation in the hydraulic pumps.

There normally is a flow rate difference between the flow rate of the reflux to the suction side of the first hydraulic pump through the first relief passage and the flow rate of the reflux to the suction side of the second hydraulic pump through the second relief passage (the flow rate difference is normally determined to a specific value if the first actuator and the second actuator are specified). Such different flow rates result in different cavitation restraining effects achieved by the supercharges into the two hydraulic pumps.

SUMMARY OF THE INVENTION

Accordingly, it is an object of the present invention to solve the aforementioned problems. According to the present invention, there is provided a tandem pump apparatus including a first hydraulic pump for supplying operating fluid to a first actuator, and a second hydraulic pump for supplying operating fluid to a second actuator, wherein the second hydraulic pump and the first hydraulic pump are caused to cooperate with each other. The first hydraulic pump is provided with a first flow rate control valve for refluxing a surplus of a flow discharged from the first hydraulic pump to a suction side of the pump through a first relief passage. The second hydraulic pump is provided with a second flow rate control valve for refluxing a surplus of a flow discharged from the second hydraulic pump to a suction side of the pump through a second relief passage. A connecting passage connects the first relief passage downstream from the first flow rate control valve and the second relief passage downstream from the second flow rate control valve. The connecting passage is provided with a check valve or allowing operating fluid to flow from one of the relief passages that has a relatively great reflux flow rate to the other relief passage having a relatively small reflux flow rate.

The tandem valve of the present invention introduces a portion of the reflux of operating fluid through one of the relief passages wherein the reflux flow rate is greater, to the relief passage having a smaller reflux flow rate, through the connecting passage having the check valve. Therefore, it becomes possible to achieve sufficiently great restraint of cavitation in a hydraulic pump having a smaller reflux flow rate by increasing the supercharge into the hydraulic pump, while securing sufficiently great restraint of cavitation by supercharge into the hydraulic pump having a greater reflux flow rate.

BRIEF DESCRIPTION OF THE INVENTION

The foregoing and further objects, features and advantages of the present invention will become apparent from the following description of a preferred embodiment with reference to the accompanying drawings, wherein like numerals are used to represent like elements and wherein.

DETAILED DESCRIPTION OF THE PREFERRED EMBODIMENT

A preferred embodiment of the present invention will be described in detail hereinafter with reference to the accompanying drawings.

Figure 1:
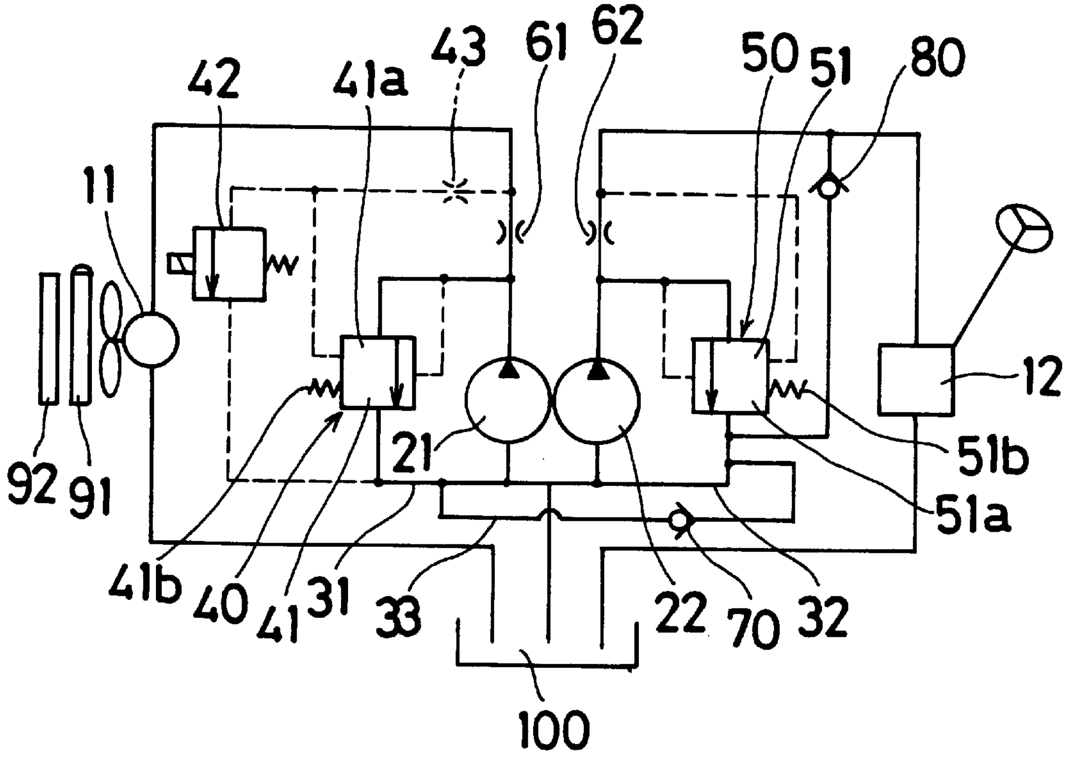
FIG. 1 is a hydraulic circuit diagram of a preferred embodiment of the tandem pump apparatus of the present invention.

Referring to FIG. 1, a tandem pump apparatus according to the present invention is applied to operate the actuators of a hydraulic fan motor 11 and a power steering apparatus 12 of a motor vehicle. In the tandem pump apparatus, a hydraulic pump 21 for supplying operating fluid to the hydraulic fan motor 11 and a hydraulic pump 22 for supplying operating fluid to the power steering apparatus 12 are cooperatively driven by an engine (not shown) or an electric motor (not shown). The hydraulic fan motor 11 is provided for cooling an engine radiator 91 and an air-conditioner condenser 92.

The hydraulic pump 21 draws in operating fluid from a tank 100 and discharges it toward the hydraulic fan motor 11. The hydraulic pump 21 is provided with a flow rate control valve 40 for refluxing a surplus of the flow discharged from the hydraulic pump 21 to a suction side of the hydraulic pump 21 through a relief passage 31. The hydraulic pump 22 draws in operating fluid from the tank 100 and discharges it toward the power steering apparatus 12. The hydraulic pump 22 is provided with a flow rate control valve

50 for refluxing a surplus of the flow discharged from the hydraulic pump 22 to a suction side of the hydraulic pump 22 through a relief passage 32, and a relief valve 80 for coping with steering operation when the vehicle is not moving.

The flow rate control valve 40 has a main valve 41 for controlling the opening of relief passage 31, and a pilot electromagnetic valve 42 capable of fully opening the main valve 41 (to a full open state such that substantially the entire flow discharged from the hydraulic pump 21 is refluxed to the hydraulic pump 21). The main valve 41 has a spool 41*a* and a spring 41*b* that urges the spool 41*a* in the closing direction. Opposite ends of the spool 41*a* receive, as a pilot pressure, a differential pressure across a throttle 61 provided in the discharge passage from the hydraulic pump 21. Therefore, the operation of the spool 41*a* is controlled by the spring 41*b* and the differential pressure across the throttle 61 so as to control the flow rate of the reflux of operating fluid to the suction side of the hydraulic pump 21 through the relief passage 31. The pilot electromagnetic valve 42 is a normally closed valve whose closing and opening operation is controlled by an electric control device (not shown). The pilot electromagnetic valve 42 is opened in the conditions that cause a low operating speed of the hydraulic fan motor 11, so as to connect a pilot passage (where a throttle 43 is provided) downstream from the throttle 61 to a drain passage and, thereby, fully open the main valve 41. The opening and closing operation of the pilot electromagnetic valve 42 is linearly controlled by the electric control device (not shown) in accordance with the coolant temperature inside the engine radiator 91 and the temperature of the air-conditioner condenser 92.

The flow rate control valve 50 is formed substantially only by a main valve 51 that controls the opening of the relief passage 32. The main valve 51 has a spool 51*a* and a spring 51*b* that urges the spool 51*a* in the closing direction. Opposite ends of the spool 51*a* receive, as a pilot pressure, a differential pressure across a throttle 62 provided in the discharge passage from the hydraulic pump 22. Therefore, the operation of the spool 51*a* is controlled by the spring 51*b* and the differential pressure across the throttle 62 so as to control the flow rate of the reflux of operating fluid to the suction side of the hydraulic pump 22 through the relief passage 32 (this flow rate is greater than the flow rate of the reflux of operating fluid to the suction side of the hydraulic pump 21 through the relief passage 31 when the pilot electromagnetic valve 42 is closed).

Figure 2:
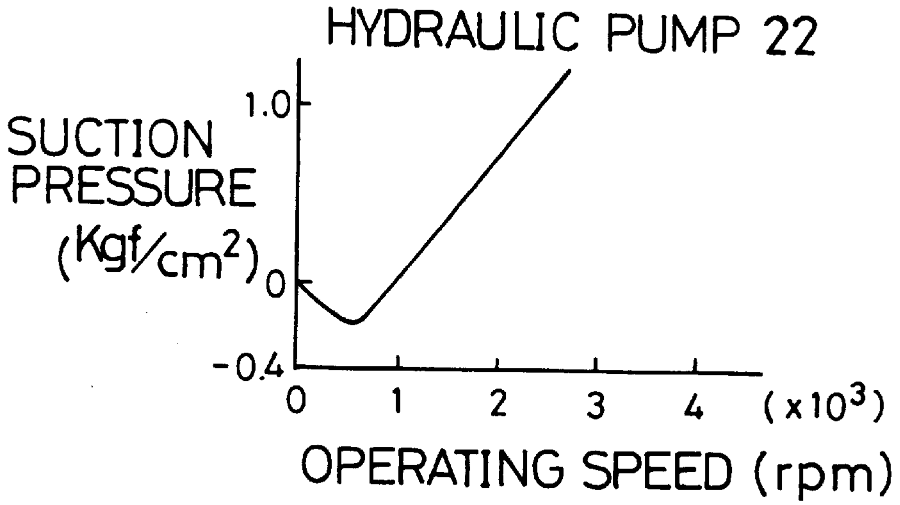
FIG. 2 is a graph indicating the relationship between the operating speed and the suction pressure of a hydraulic pump disposed on a power steering side, wherein neither a connecting passage nor check valve as shown in FIG. 1 is provided.
Figure 3:
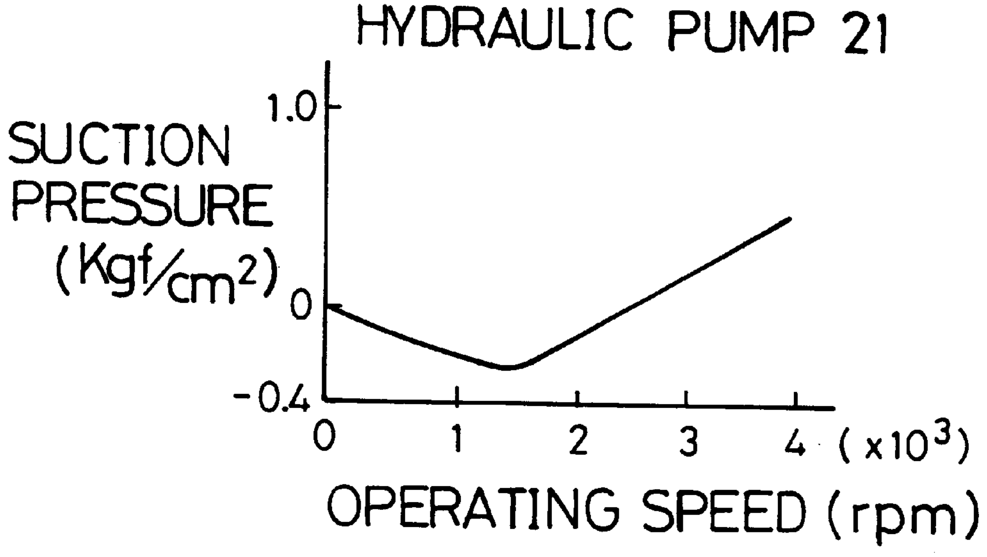
FIG. 3 is a graph indicating the relationship between the operating speed and the suction pressure of a hydraulic pump disposed on a hydraulic fan motor side, wherein neither a connecting passage nor a check valve as shown in FIG. 1 is provided.
Figure 4:
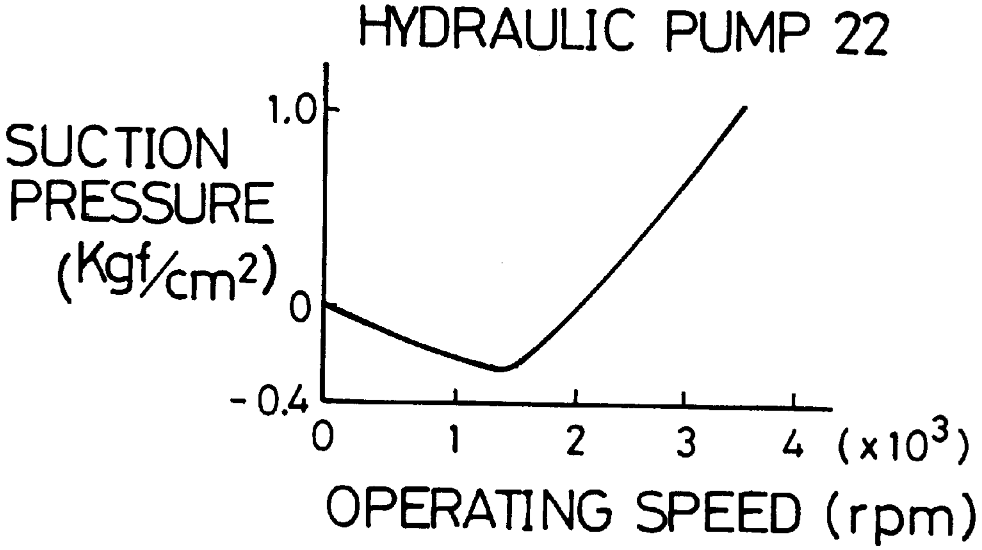
FIG. 4 is a graph indicating the relationship between the operating speed and the suction pressure of the hydraulic pump shown in FIG. 1 which is disposed on a power steering side.
Figure 5:
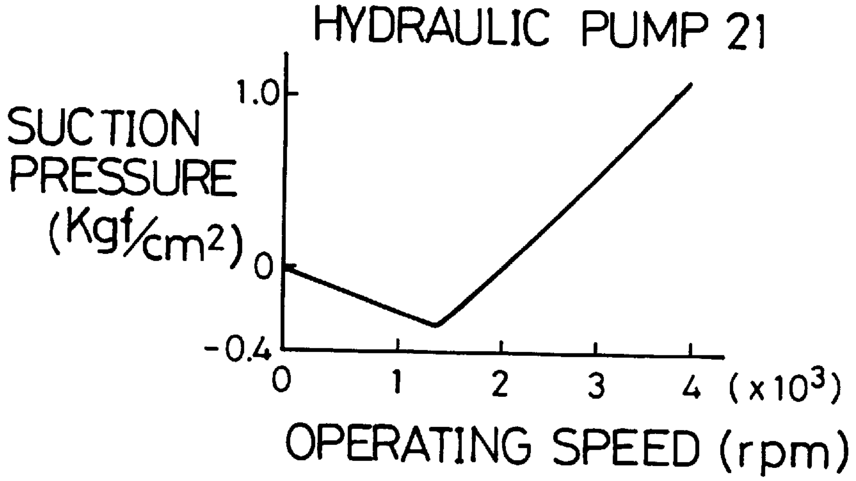
FIG. 5 is a graph indicating the relationship between the operating speed and the suction pressure of the hydraulic pump shown in FIG. 1 which is disposed on a hydraulic fan motor side.

In this embodiment, the relief passage 31 downstream from the flow rate control valve 40 and the relief passage 32 downstream from the flow rate control valve 50 are connected by a connecting passage 33. The connecting passage 33 is provided with a check valve 70 which, when both the hydraulic fan motor 11 and the power steering apparatus 12 are supplied with operating fluid, allows operating fluid to flow from the relief passage 32, where the reflux flow rate is greater, to the relief passage 31, where the reflux flow rate is less. Since it is thus possible to introduce a portion of the reflux of operating fluid in the relief passage 32 having a greater reflux flow rate into the relief passage 31 having a less reflux flow rate, the embodiment is able to achieve a sufficiently greater effect of restraining cavitation by increasing the supercharge into the hydraulic pump 21 on the less reflux flow rate side, while securing a sufficiently greater cavitation restraining effect by supercharge into the hydraulic pump 22 on the greater reflux flow rate side. This operation and effect is indicated by the graphs of FIGS. 2 to 5. FIG. 2 is a graph indicating the relationship between the operating speed and the suction pressure of the hydraulic pump 22, in a case where neither the connecting passage 33 nor the check valve 70 is provided. FIG. 3 is a graph indicating the relationship between the operating speed and the suction pressure of the hydraulic pump 21, in a case where wherein neither the connecting passage 33 nor the check valve 70 is provided. FIG. 4 is a graph indicating the relationship between the operating speed and the suction pressure of the hydraulic pump 22, in a case where the connecting passage 33 and the check valve 70 are provided. FIG. 5 is a graph indicating the relationship between the operating speed and the suction pressure of the hydraulic pump 21, in a case where the connecting passage 33 and the check valve 70 are provided. As can be seen from the graphs of FIGS. 2 and 4, even if the connecting passage 33 and the check valve 70 are provided, sufficiently greater suction pressure of the hydraulic pump 22 is maintained. Further, as can be seen from the graphs of FIGS. 3 and 5, if the connecting passage 33 and the check valve 70 are provided, the suction pressure of the hydraulic pump 21 is considerably increased, indicating a considerable increase in the cavitation restraining effect.

Although, in the foregoing embodiment, a tandem pump apparatus according to the present invention is applied to operate the actuators of the hydraulic fan motor 11 and the power steering apparatus 12 of a motor vehicle, the tandem pump apparatus of the present invention is not limited to the embodiment. To the contrary, the present invention may be applied to any tandem pump apparatus wherein a first hydraulic pump for supplying operating fluid to a first actuator and a second hydraulic pump for supplying operating fluid to a second actuator are caused to cooperate with each other, and wherein the first hydraulic pump is provided with a first flow rate control valve for refluxing a surplus of a flow discharged from the first hydraulic pump to a suction side of the pump through a first relief passage, and wherein the second hydraulic pump is provided with a second flow rate control valve for refluxing a surplus of a flow discharged from the second hydraulic pump to a suction side of the pump through a second relief passage.

Figure 6:
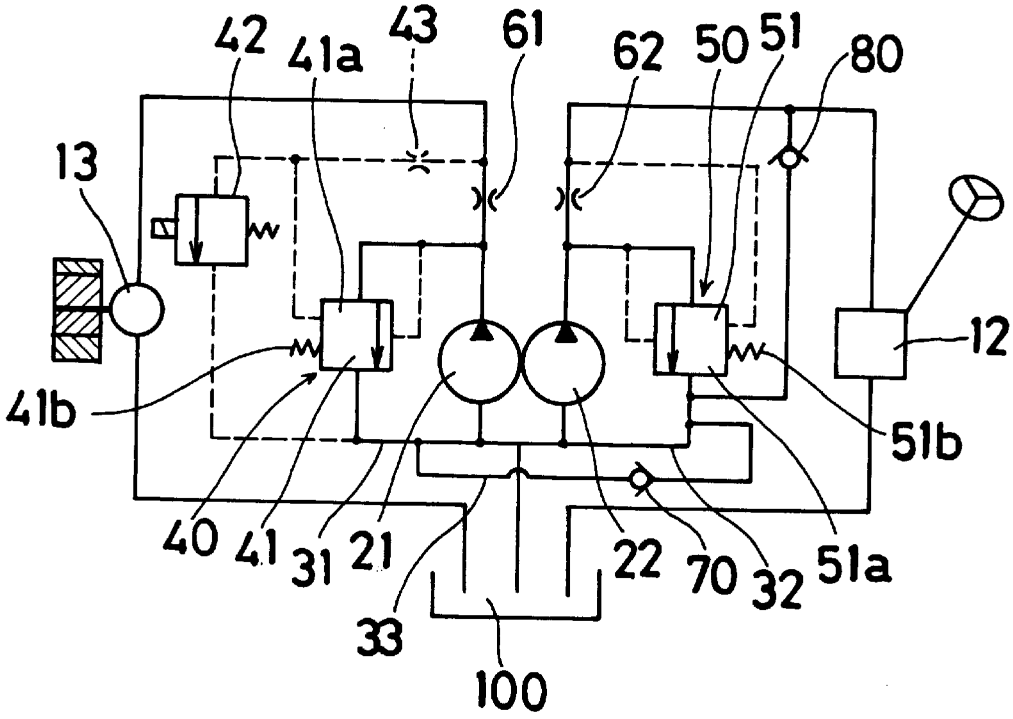
FIG. 6 is a hydraulic circuit diagram of a second embodiment of the tandem pump apparatus of the present invention.

FIG. 6 illustrates another modified version of the preferred embodiment, which specifically is a modified arrangement of a water pump apparatus 13. In FIG. 6, the same parts in FIG. 1 are used with the same numerals of FIG. 1. In this modified construction, the check valve 70 allows operating fluid to flow from the relief passage 32, where the reflux flow rate is greater, to the relief passage 31, where the reflux flow rate is less. Since it is thus possible to introduce a portion of the reflux of operating fluid in the relief passage 32 having a greater reflux flow rate into the relief passage 31 having a less reflux flow rate, the embodiment is able to achieve a sufficiently greater effect of restraining cavitation by increasing the supercharge into the hydraulic pump 21 on the less reflux flow rate side, while securing a sufficiently great cavitation restraining effect by supercharge into the hydraulic pump 22 on the greater reflux flow rate side.

Figure 7:
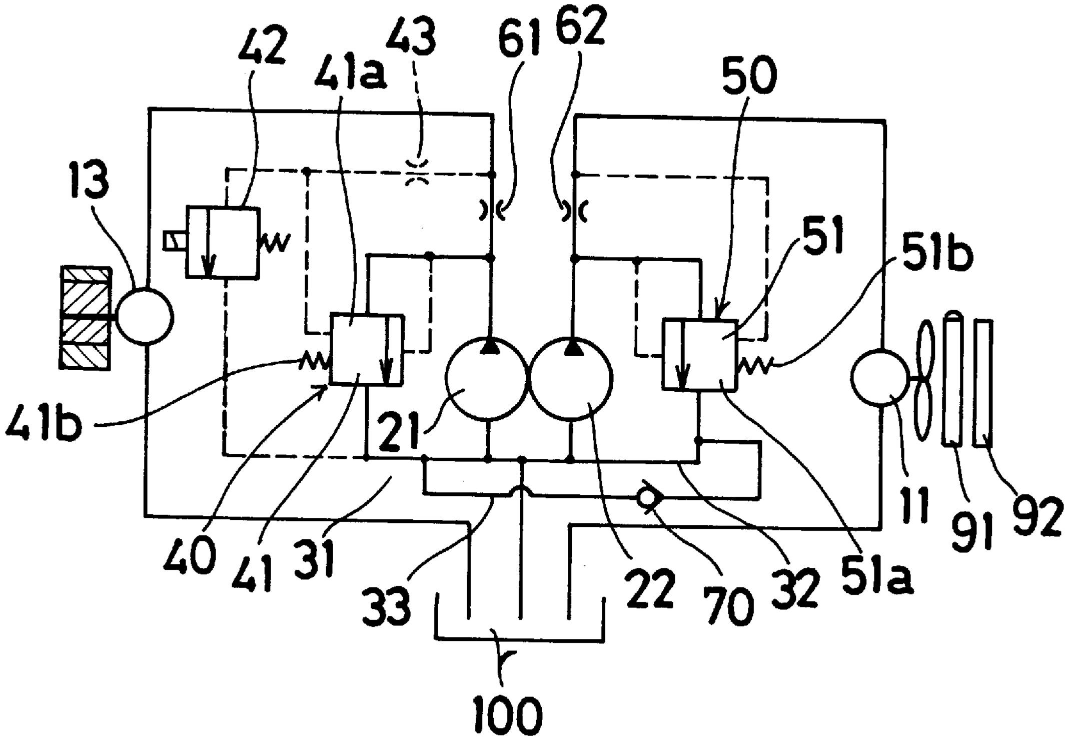
FIG. 7 is a hydraulic circuit diagram of a third embodiment of the tandem pump apparatus of the present invention.

FIG. 7 illustrates another modified version of the preferred embodiment, which specifically is a modified arrangement of the hydraulic fan motor 11 and the water pump apparatus 13. In FIG. 7, the same parts in FIG. 1 are used with the same reference numerals of FIG. 1. In this modified construction, the check valve 70 allows operating fluid to flow from the relief passage 32, where the reflux flow rate is greater, to the relief passage 31, where the reflux flow rate is less. Since it is thus possible to introduce a portion of the reflux of operating fluid in the relief passage 32 having a greater reflux flow rate into the relief passage 31 having a less reflux flow rate, the embodiment is able to achieve a sufficiently greater effect of restraining cavitation by increasing the supercharge into the hydraulic pump 21 on the less reflux flow rate side, while securing a sufficiently great cavitation restraining effect by supercharge into the hydraulic pump 22 on the greater reflux flow rate side.

While the invention has been described in conjunction with one of its preferred embodiments, it should be understood that changes and modifications may be made without departing from the scope and spirit of the appended claims.

What is claimed is:

1. A tandem pump apparatus comprising:

a first hydraulic pump having a first suction port for supplying operating fluid to a first actuator;

a second hydraulic pump having a second suction port for supplying operating fluid to a second actuator, the second hydraulic pump and the first hydraulic pump being operatively connected to cooperate with each other;

a first flow rate control valve connected to the first hydraulic pump for refluxing a surplus of a flow discharge from the first hydraulic pump;

a second flow rate control valve connected to the second hydraulic pump for refluxing a surplus of a flow discharged from the second hydraulic pump;

a first relief passage connecting the first flow rate control valve to the first suction port;

a second relief passage connecting the second flow rate control valve to the second suction port and having a smaller reflux flow rate than the first relief passage; and a connecting passage connecting the first relief passage and the second relief passage and for allowing operating fluid to flow from the first relief passage to the second relief passage.

2. A tandem pump apparatus in claim 1, wherein the first actuator is a hydraulic fan motor, the second actuator is a power steering apparatus and the check valve allows operating fluid to flow from the second relief passage to the first relief passage.

3. A tandem pump apparatus in claim 1, wherein the first actuator is a water pump apparatus, the second actuator is a power steering apparatus and the check valve allows operating fluid to flow from the second relief passage to the first relief passage.

4. A tandem pump apparatus in claim 1, wherein the first actuator is a water pump apparatus, the second actuator is a hydraulic fan motor and the check valve allows operating fluid to flow from the second relief passage to the first relief passage.

5. A tandem pump apparatus in claimed in claim 1, further comprising a check valve provided in the connecting passage for enabling the flux of the operating fluid from the first relief passage to the second relief passage and for hindering the flux of the operating fluid from the second relief passage to the first relief passage.

* * * * *